United States Patent
Kim et al.

(10) Patent No.: US 9,070,929 B2
(45) Date of Patent: Jun. 30, 2015

(54) SECONDARY BATTERY HAVING ZIGZAG-SHAPED SEALING PART

(71) Applicant: LG Chem, Ltd., Seoul (KR)

(72) Inventors: Seong Yong Kim, Daejeon (KR); Hanho Lee, Seoul (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/289,033

(22) Filed: May 28, 2014

(65) Prior Publication Data

US 2014/0272488 A1  Sep. 18, 2014

Related U.S. Application Data (63) Continuation of application No. PCT/KR2013/000727, filed on Jan. 30, 2013.

(30) Foreign Application Priority Data

Feb. 2, 2012  (KR) .................. 10-2012-0010913

(51) Int. Cl.
| | |
|---|---|
| *H01M 2/00* | (2006.01) |
| *H01M 2/12* | (2006.01) |
| *H01M 2/20* | (2006.01) |
| *H01M 2/02* | (2006.01) |
| *H01M 10/052* | (2010.01) |
| *H01M 10/058* | (2010.01) |

(52) U.S. Cl.
CPC ............ *H01M 2/1241* (2013.01); *H01M 2/021* (2013.01); *H01M 2/0277* (2013.01); *H01M 2/0285* (2013.01); *H01M 2/0287* (2013.01); *H01M 2/024* (2013.01); *H01M 10/052* (2013.01); *H01M 10/058* (2013.01); *H01M 2220/20* (2013.01); *Y02E 60/122* (2013.01); *Y02T 10/7011* (2013.01)

(58) Field of Classification Search
CPC . H01M 2/021; H01M 2/0277; H01M 2/0285; H01M 2/0287; H01M 2/1241; H01M 2/24; H01M 2220/20

USPC .......................... 429/56, 54, 94, 185, 66, 160
See application file for complete search history.

(56) References Cited

U.S. PATENT DOCUMENTS

| | | | |
|---|---|---|---|
| 2005/0058889 | A1* | 3/2005 | Goishihara ..................... 429/94 |
| 2011/0104527 | A1* | 5/2011 | Choi et al. ..................... 429/53 |
| 2011/0151292 | A1* | 6/2011 | Song .............................. 429/56 |

FOREIGN PATENT DOCUMENTS

| | | |
|---|---|---|
| JP | 2001273884 A | 10/2001 |
| JP | 2003132868 A | 5/2003 |
| KR | 20060087185 A | 8/2006 |
| KR | 20080019551 A | 3/2008 |
| KR | 20110072733 A | 6/2011 |

OTHER PUBLICATIONS

Machine Translation of: JP 2003/132868, Marumoto et al., May 9, 2003.*
International Search Report for Application No. PCT/KR2013/000727 dated Apr. 30, 2013.

* cited by examiner

*Primary Examiner* — Kenneth Douyette
(74) *Attorney, Agent, or Firm* — Lerner, David, Littenberg Krumholz & Mentlik, LLP (57) ABSTRACT

Disclosed is a secondary battery in which an electrode assembly is accommodated in a battery case, wherein the battery case is made of a laminate sheet including a resin layer and a metal layer and hermetically sealed through sealing of an outer circumferential surface thereof in a state of accommodating the electrode assembly, and at least one of sealing parts at the outer circumferential surface of the battery case is provided with at least two continuously formed recessed portions.

17 Claims, 7 Drawing Sheets

SECONDARY BATTERY HAVING ZIGZAG-SHAPED SEALING PART

CROSS-REFERENCE TO RELATED APPLICATIONS

The present application is a continuation of International Application No. PCT/KR2013/000727 filed on Jan. 30, 2013, which claims the benefit of Korean Patent Application No. 10-2012-0010913, filed on Feb. 2, 2012, the disclosures of which are incorporated herein by reference.

TECHNICAL FIELD

The present invention relates to a secondary battery including a zigzag-shaped sealing part and, more particularly, to a secondary battery in which an electrode assembly is accommodated in a battery case, wherein the battery case is made of a laminate sheet including a resin layer and a metal layer and hermetically sealed through sealing of an outer circumferential surface thereof in a state of accommodating the electrode assembly, and at least one of sealing parts at the outer circumferential surface of the battery case is provided with at least two continuously formed recessed portions.

BACKGROUND ART

As mobile device technology continues to develop and demand therefore continues to increase, demand for batteries as energy sources is rapidly increasing. Accordingly, various studies on batteries that may meet a variety of needs have been underway.

In addition, as interest in environmental problems is recently increasing, research into electric vehicles (EVs), hybrid EVs (HEVs), and the like that can replace vehicles using fossil fuels, such as gasoline vehicles, diesel vehicles, and the like, which are one of the main causes of air pollution, is actively underway. As a power source of EVs, HEVs, and the like, a nickel metal-hydride secondary battery is mainly used. However, research into lithium secondary batteries having high energy density, high discharge voltage and output stability is actively underway and some such lithium secondary batteries are commercially available.

Although lithium secondary batteries have excellent electrical characteristics and are relatively lightweight, lithium secondary batteries have not been widely used due to safety problems thereof. To enhance safety of such lithium secondary batteries, use of a positive temperature coefficient element, a temperature fuse, a decompression protection circuit or the like to prevent an increase in temperature has been tried.

However, although these lithium secondary batteries include the elements described above, gases may be generated due to abnormal reaction inside batteries under abnormal conditions.

Secondary batteries currently produced basically have an internal vacuum structure. Such structure is intended to inhibit potential side reaction by removing reactive gases from the inside of batteries. However, due to this, when gases are generated under abnormal conditions, a secondary battery needs to be filled with a large amount of gas until the gas is discharged to the outside and discharge time thereof is delayed, which increases risk of explosion of the secondary battery.

Figure 1:
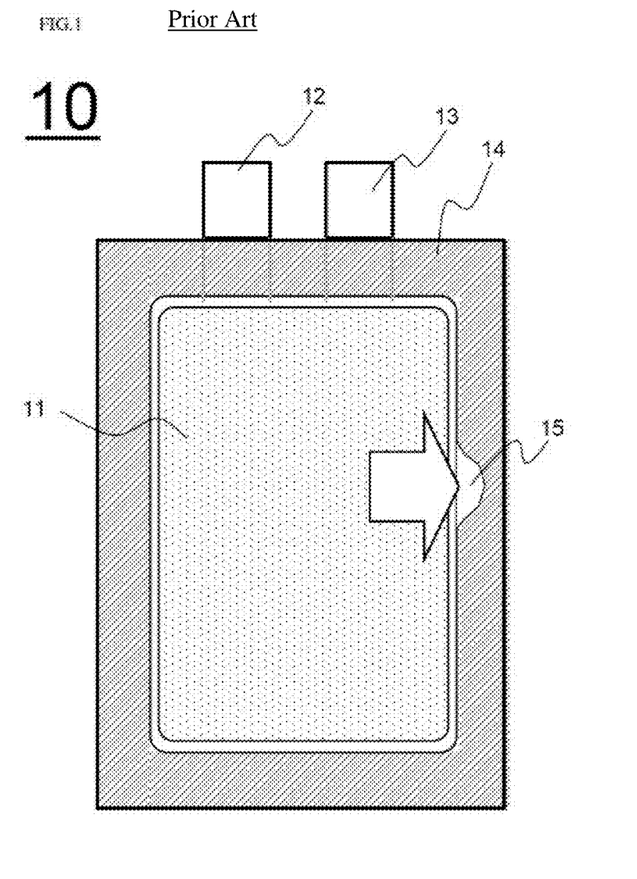
Figure 3:
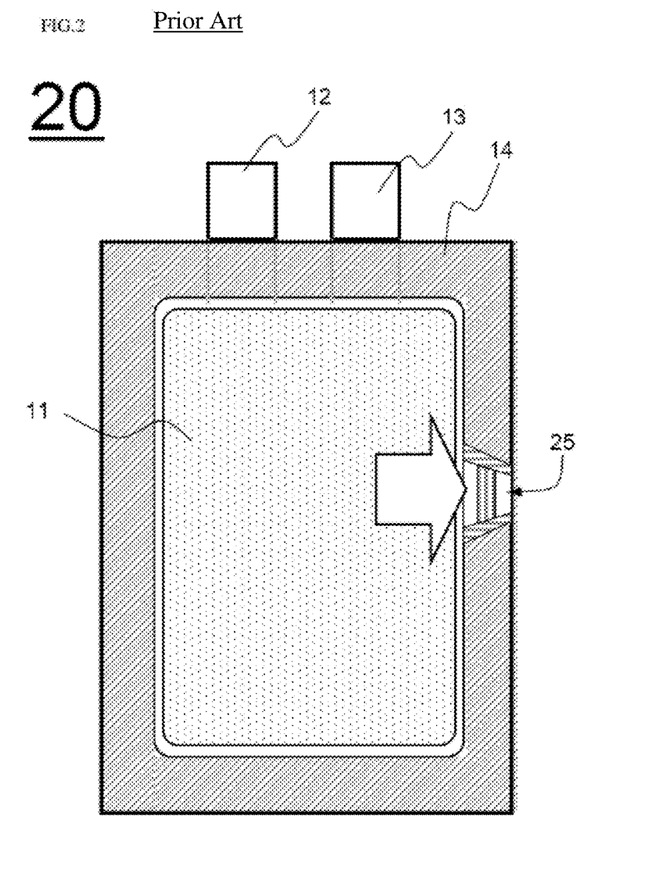

Thus, to address the above-described problems, as illustrated in FIGS. 1 to 3, formation of a vent part at a sealing part of a battery case has conventionally been tried.

In particular, referring to FIGS. 1 to 3, a vent part 15, 25 or 35 is formed at a sealing part provided at one side of a battery case 14 of a battery cell 10, 20 or 30.

The vent part 15 of the battery cell 10 of FIG. 1 has a shape recessed towards the outside from the inside of the battery case 14. The vent part 25 of the battery cell 20 of FIG. 2 has a modified width. The vent part 35 of the battery cell 30 of FIG. 3 has a structure in which impurities or the like are inserted into the sealing part.

The vent parts 15, 25 and 35 have a structure in which, when internal pressure of the battery case 14 increases, the vent parts 15, 25 and 35 are ruptured by stress concentrated thereon and thus gases generated inside the battery case 14 are discharged to the outside. Thus, specific sizes of vent parts having such structures are determined according to critical pressure to rupture the vent parts. However, the vent parts 15, 25 and 35 respectively illustrated in FIGS. 1 to 3 have a structure that may be easily damaged by expansion and contraction of the battery cells 10, 20 and 30, occurring during charge and discharge. In addition, even when vent parts are designed to have a specific size according to critical pressure, the vent parts may rupture before reaching the critical pressure because the vent parts may be easily damaged as described above.

Therefore, there is a very urgent need to develop a secondary battery that may be vented accurately corresponding to a case in which internal pressure of a battery cell reaches critical pressure.

DISCLOSURE

Technical Problem

The present invention aims to address the aforementioned problems of the related art and to achieve technical goals that have long been sought.

In particular, an object of the present invention is to provide a secondary battery having enhanced safety and having a structure that may reliably discharge a gas when internal pressure of the secondary battery reaches critical pressure, by continuously forming recessed portions at a sealing part at the outer circumferential surface of a battery case.

In addition, another object of the present invention is to provide a secondary battery with enhanced safety through reduction in risk of explosion such that a battery case is vented when abnormal operating conditions are not relatively severe and thus an internal gas is discharged therefrom.

Technical Solution

In accordance with one aspect of the present invention, provided is a secondary battery
in which an electrode assembly is accommodated in a battery case,
wherein the battery case is made of a laminate sheet including a resin layer and a metal layer and hermetically sealed through sealing of an outer circumferential surface thereof in a state of accommodating the electrode assembly, and
at least one of sealing parts at the outer circumferential surface of the battery case is provided with at least two continuously formed recessed portions.

As described above, conventional vent parts have a structure that may be easily damaged by expansion and contraction of a battery cell, occurring during charge and discharge of the battery cell and a structure in which internal pressure and stress are concentrated only on specific regions thereof. Thus, vent parts having the structure described above may rupture earlier although they do not reach critical pressure and thus overall operating reliability of the vent parts is low.

By contrast, in the secondary battery according to the present invention, at least two recessed portions are continuously formed and thus internally generated pressure may be distributed to the recessed portions. Accordingly, when internal pressure of the secondary battery reaches critical pressure, gas discharge may be safely performed accurately corresponding to this.

In particular, the battery case according to the present invention is made of a laminate sheet including a resin layer and a metal layer and such material has fatigue fracture properties in which the sealing parts of the outer circumferential surface of the laminate sheet are deformed or broken or have reduced rigidity by repeated expansion and contraction of the battery cell, i.e., repeated application of external force. Moreover, vent parts designed to have a weaker structure than other sealing parts so as to be vented by internal pressure have a structure in which such fatigue fracture phenomenon is accelerated. Thus, conventional vent parts having a single structure may undergo fatigue fracture by repeated external force even though the vent parts are designed to have a specific size according to critical pressure and, accordingly, the vent parts may be vented at a lower pressure than the set critical pressure or vented at an unintended pressure.

However, the battery case according to the present invention includes a vent part having a structure in which plural recessed portions are arranged adjacent to one another and thus internal pressure or external force may be distributed to the recessed portions. Accordingly, occurrence of the above-described fatigue fracture may be significantly reduced and, consequently, the battery case may be vented accurately in response to the set critical pressure.

In one specific embodiment, the recessed portions may have a structure in which the sealing part at the outer circumferential surface of the battery case is formed on a boundary line in the direction of the electrode assembly and at least two recessed portions are continuously formed to have a zigzag shape.

The zigzag shape may, for example, be a shape in which, as seen on a horizontal cross-section, at least two polygons are adjacent to each other or at least two semicircles are adjacent to each other. In particular, the zigzag shape is not particularly limited so long as the shape enables distribution of pressure or stress generated in the battery case to the recessed portions. For example, the zigzag shape may be a shape in which at least two triangles, tetragons or ovals are adjacent to each other.

In one specific embodiment, a total length of the continuously formed recessed portions may be 5% to 40% a length of the sealing parts at the outer circumferential surface, and the number of the recessed portions may be 2 to 10.

In particular, when the total length of the recessed portions is less than 5% the length of the sealing parts at the outer circumferential surface, it is difficult to obtain gas discharge effects at a relatively low internal pressure as described above. On the other hand, when the total length of the recessed portions exceeds 40% the total length of the sealing parts at the outer circumferential surface, sealing force of the sealing parts may be reduced.

A recess depth of the recessed portion may be 5% to 50% the width of the sealing part, and the width of the recessed portion may be 5% to 50% the width of the sealing part.

In particular, when the recess depth or width of the recessed portion exceeds 50% the width of the sealing part, the sealing force of the sealing part may be reduced. On the other hand, when the recess depth or width of the recessed portion is less than 5% the width of the sealing part, it is difficult to obtain desired effects.

In some cases, the battery case may contain an inert gas injected so as to maintain the inside of the battery case at normal pressure.

Commercially available secondary batteries basically have an internal vacuum structure. This structure is designed to prevent various potential side reactions by removing reactive gases inside the battery case. However, due to this, when a gas is generated inside a secondary battery due to abnormal reaction of the battery such as overcharge or the like, relatively long time is required until the battery is vented and, as a result, the internal abnormal reaction is aggravated and risk of explosion increases.

By contrast, in a case in which an inert gas is injected into a secondary battery to maintain the inside thereof in a normal pressure state, when the abnormal reaction as described above occurs, the secondary battery has an increased internal pressure within a relatively short period of time so as to be vented. Thus, aggravation of such abnormal reaction may be prevented and risk of explosion may also be reduced.

The inert gas may be any gas that does not cause separate electrochemical reaction inside the secondary battery and may, for example, be at least one selected from the group consisting of helium, nitrogen, and argon.

The battery case may be filled with the inert gas after removal of a gas generated during initial charge and discharge performed to activate the secondary battery in a manufacturing process thereof. In general, gases that are not needed to contribute to battery performance are generated in an activation process when assembling the secondary battery and are removed through a separate process. Thus, the battery case may be filled with the inert gas after removal of gases generated in the activation process.

The electrode assembly is not particularly limited and examples thereof include a winding-type electrode assembly, a stack-type electrode assembly, and a stack/folding type electrode assembly.

An electrode assembly has a cathode/separator/anode structure constituting a secondary battery. In general, an electrode assembly is broadly divided into two types according to structure thereof: jellyroll type (winding type) and stack type. A jellyroll type electrode assembly is manufactured by coating a metal foil used as a current collector with an electrode active material or the like, drying and pressing the coated metal foil, cutting the foil into a band shape with desired width and length, separating an anode from a cathode using a separator, and spirally winding the resulting structure. Such a jellyroll type electrode assembly is suitable for use in a cylindrical battery but is unsuitable for use in a rectangular battery or a pouch-type battery due to separation of an electrode active material, poor space utilization, and the like. By contrast, a stack type electrode assembly has a structure in which a plurality of cathode and anode units are sequentially stacked and is easy to have a rectangular shape, but is disadvantageous in that manufacturing processes are complicated and short circuit is caused because an electrode is pushed when impact is applied thereto.

To address these problems, as an advanced electrode assembly which is a combination of the jellyroll type electrode assembly and the stack type electrode assembly, an electrode assembly having a structure in which full cells having a cathode/separator/anode structure of a certain unit size or bicells having a cathode(anode)/separator/anode(cathode)/separator/cathode(anode) structure of a certain unit size are folded using a long continuous separator film has been developed, and such an electrode assembly is referred to as a stack/folding type electrode assembly.

The full cell has a unit structure of cathode/separator/anode in which the cathode and the anode are disposed at opposite sides of the cell. Examples of the full cell include, but are not limited to, a cathode/separator/anode cell (most basic structure) and a cathode/separator/anode/separator/cathode/separator/anode cell.

The bicell has a unit structure of cathode/separator/anode/separator/cathode or a unit structure of anode/separator/cathode/separator/anode in which identical electrodes are disposed at opposite sides of the cell. In the present specification, the bicell having a cathode/separator/anode/separator/cathode structure is denoted as "C-type bicell," and the bicell having an anode/separator/cathode/separator/anode structure is denoted as "A-type bicell." That is, the bicell in which cathodes are disposed at opposite sides of the cell is referred to as a C-type bicell, and the bicell in which anodes are disposed at opposite sides of the cell is referred to as an A-type bicell.

The number of cathodes, anodes and separators that constitute these bicells is not particularly limited so long as electrodes disposed at opposite sides of the bicell have the same structure.

The full cell and the bicell are manufactured by disposing a separator between a cathode and an anode and bonding the elements to each other. The bonding process may, for example, be thermal fusion.

As described above, the battery case is made of a laminate sheet including a resin layer and a metal layer and such a laminate sheet may reduce the weight of the secondary battery more than a battery case made of a metal material. In addition, secondary batteries used as a power source of mobile products or medium and large-scale devices must be lightweight. According to the present invention, the battery case is hermetically sealed through sealing of the outer circumferential surface thereof in a state in which the electrode assembly is accommodated in the battery case.

In one exemplary embodiment, the laminate sheet may have a stacked structure including an outer resin layer, an air and moisture-blocking metal layer, and an inner thermal fusion resin layer.

The outer resin layer has to have high resistance to external environments, thus requiring a predetermined level or more of tensile strength and weather resistance. In this regard, a polymer resin of the outer coating layer may contain polyethylene naphthalate (PEN), polyethylene terephthalate (PET), or oriented nylon that exhibits high tensile strength and weather resistance.

In addition, the outer coating layer may be formed of PEN and/or may be provided at an outer surface thereof with a PET layer.

PEN has high tensile strength and weather resistance even at a small thickness as compared to PET and is thus suitable for use in the outer coating layer.

A polymer resin of the inner resin layer may be a polymer resin that has thermal fusion properties (thermal adhesion properties) and low hygroscopicity with respect to an electrolyte to prevent permeation of the electrolyte and is not expanded or deposited by the electrolyte. More particularly, the polymer resin of the inner resin layer may be a chlorinated polypropylene (CPP) film.

In one exemplary embodiment, the laminate sheet according to the present invention may include an outer coating layer having a thickness of 5 μm to 40 μm a barrier layer having a thickness of 20 μm to 150 μm, and an inner sealant layer having a thickness of 10 μm to 50 μm. When the thicknesses of the respective layers of the laminate sheet are too small, it is difficult to anticipate barrier performance for materials and enhancement in strength. On the other hand, when the thicknesses of the respective layers of the laminate sheet are too great, proccessability is deteriorated and the thickness of the laminate sheet is increased.

The secondary battery may be a lithium secondary battery having a structure in which an electrode assembly including a cathode, an anode, and a separator disposed therebetween is impregnated with a lithium salt-containing non-aqueous electrolyte.

The cathode may be manufactured by, for example, coating a cathode mixture including a cathode active material on a cathode current collector and drying the coated cathode current collector. As desired, the cathode mixture may further selectively include a binder, a conductive material, a filler, and the like.

The cathode current collector is generally fabricated to a thickness of 3 to 500 μm. The cathode current collector is not particularly limited so long as it does not cause chemical changes in the fabricated lithium secondary battery and has high conductivity. For example, the cathode current collector may be made of stainless steel, aluminum, nickel, titanium, sintered carbon, aluminum or stainless steel surface-treated with carbon, nickel, titanium, or silver, or the like. The cathode current collector may have fine irregularities at a surface thereof to increase adhesion between the cathode active material and the cathode current collector. In addition, the cathode current collector may be used in any of various forms including films, sheets, foils, nets, porous structures, foams, and non-woven fabrics.

The cathode active material is a material capable of inducing electrochemical reaction and is a lithium transition metal oxide including at least two transition metals. Examples of lithium transition metal oxides include, but are not limited to, layered compounds substituted with one or more transition metals such as lithium cobalt oxide ($LiCoO_2$) and lithium nickel oxide ($LiNiO_2$); lithium manganese oxides substituted with one or more transition metals; lithium nickel-based oxides represented by the formula $LiNi_{1-y}M_yO_2$ where M is at least one of Co, Mn, Al, Cu, Fe, Mg, B, Cr, Zn, and Ga and $0.01 \leq y \leq 0.7$); lithium nickel cobalt manganese composite oxides represented by the formula $Li_{1+z}Ni_bMn_cCo_{1-(b+c+d)}M_dO_{(2-e)}A_e$ where $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si, or Y, and A=F, P, or Cl, such as $Li_{1+z}Ni_{1/3}Co_{1/3}Mn_{1/3}O_2$ and $Li_{1+z}Ni_{0.4}Co_{0.2}O_2$; and olivine-based lithium metal phosphates represented by the formula $Li_{1+x}M_{1-y}M'_yPO_{4-z}X_z$ where M is a transition metal, in particular Fe, Mn, Co, or Ni, M' is Al, Mg, or Ti, X is F, S, or N, $-0.5 \leq x \leq +0.5$, $0 \leq y \leq 0.5$, and $0 \leq z \leq 0.1$).

The conductive material is typically added in an amount of 1 to 30 wt % based on the total weight of a mixture including the cathode active material. There is no particular limit as to the conductive material, so long as it does not cause chemical changes in the fabricated battery and has conductivity. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The binder is a component assisting in binding between an active material and the conductive material and in binding of the active material to a current collector. The binder is typically added in an amount of 1 to 30 wt % based on the total weight of the mixture including the cathode active material. Examples of the binder include, but are not limited to, polyvinylidene fluoride, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluorine rubber, and various copolymers.

The filler is optionally used as a component to inhibit cathode expansion. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The anode may be manufactured by, for example, coating an anode mixture including an anode active material on an anode current collector and drying the coated anode current collector. As desired, the anode mixture may further include the above-described components such as a conductive material, a binder, a filler, and the like.

The anode current collector is typically fabricated to a thickness of 3 to 500 µm. The anode current collector is not particularly limited so long as it does not cause chemical changes in the fabricated battery and has high conductivity. For example, the anode current collector may be made of copper, stainless steel, aluminum, nickel, titanium, sintered carbon, copper or stainless steel surface-treated with carbon, nickel, titanium, or silver, and aluminum-cadmium alloys. Similar to the cathode current collector, the anode current collector may also have fine irregularities at a surface thereof to enhance adhesion between the anode current collector and the anode active material and be used in various forms including films, sheets, foils, nets, porous structures, foams, and non-woven fabrics.

Examples of the anode active material include carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb, or Ge; Me': Al, B, P, Si, Groups I, II and III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

A detailed description of the binder, the conductive material, and the components added as desired has already been provided in the description with regard to the cathode.

In some cases, a filler as a component to inhibit anode expansion may be selectively added. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

In addition, other components such as a viscosity control agent, an adhesion promoter, and the like may be further selectively added or two or more thereof may be further added in combination.

The viscosity control agent is a component to adjust the viscosity of an electrode mixture so as to facilitate a process of mixing electrode mixture components and a process of coating the electrode mixture on an electrode current collector and may be added in an amount of 30 wt % based on a total weight of the anode mixture. Examples of the viscosity control agent include, but are not limited to, carboxymethylcellulose and polyvinylidene fluoride. In some cases, the above-described solvent may also act as a viscosity control agent.

The adhesion promoter is an auxiliary component added to enhance adhesion between an active material and a current collector and may be added in an amount of 10 wt % or less based on the weight of the binder. For example, the adhesion promoter may be oxalic acid, adipic acid, formic acid, acrylic acid derivatives, itaconic acid derivatives, or the like.

The separator is disposed between the cathode and the anode and, as the separator, a thin insulating film with high ion permeability and high mechanical strength is used. The separator generally has a pore diameter of 0.01 to 10 µm and a thickness of 5 to 300 µm. As the separator, for example, sheets or non-woven fabrics, made of an olefin polymer such as polypropylene; or glass fibers or polyethylene, which have chemical resistance and hydrophobicity, are used. When a solid electrolyte such as a polymer or the like is used as an electrolyte, the solid electrolyte may also serve as a separator.

The lithium salt-containing non-aqueous electrolyte consists of an electrolyte and a lithium salt. The electrolyte may be a non-aqueous organic solvent, an organic solid electrolyte, an inorganic solid electrolyte, or the like.

Examples of the non-aqueous organic solvent include non-protic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include, but are not limited to, polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, LiI, $Li_5NI_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that is readily soluble in the non-aqueous electrolyte and examples thereof include, but are not limited to, LiCl, LiBr, LiI, $LiClO_4$, $LiBF_4$, $LiB_{10}LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the non-aqueous electrolyte may further include carbon dioxide gas, fluoro-ethylene carbonate (FEC), propene sultone (PRS), or the like.

In one embodiment, the lithium salt-containing non-aqueous electrolyte may be prepared by adding a lithium salt such as $LiPF_6$, $LiClO_4$, $LiBF_4$, $LiN(SO_2CF_3)_2$, or the like to a mixed solvent of EC or PC, which is a high dielectric solvent and a cyclic carbonate, and DEC, DMC, or EMC, which is a low viscosity solvent and a linear carbonate.

The present invention also provides a battery module including the lithium secondary battery as a unit battery and a battery pack including the battery module.

The battery pack may be used as a power source for medium and large-scale devices that require stability at high temperature, long cycle characteristics, and high rate characteristics.

Examples of such medium and large-scale devices include, but are not limited to, electric motor-driven power tools; electric vehicles (EVs), hybrid electric vehicles (HEVs), and plug-in hybrid electric vehicles (PHEVs); electric two-wheeled vehicles such as e-bikes and e-scooters; electric golf carts; and systems for storing power.

BRIEF DESCRIPTION OF THE DRAWINGS

The above and other objects, features and other advantages of the present invention will be more clearly understood from the following detailed description taken in conjunction with the accompanying drawings, in which:

FIGS. 1 to 4 are sectional views of conventional secondary batteries; and

MODE FOR INVENTION

Now, the present invention will be described in more detail with reference to the accompanying drawings and the following examples. These examples are only provided for illustration of the present invention and should not be construed as limiting the scope and spirit of the present invention.

Figure 4:
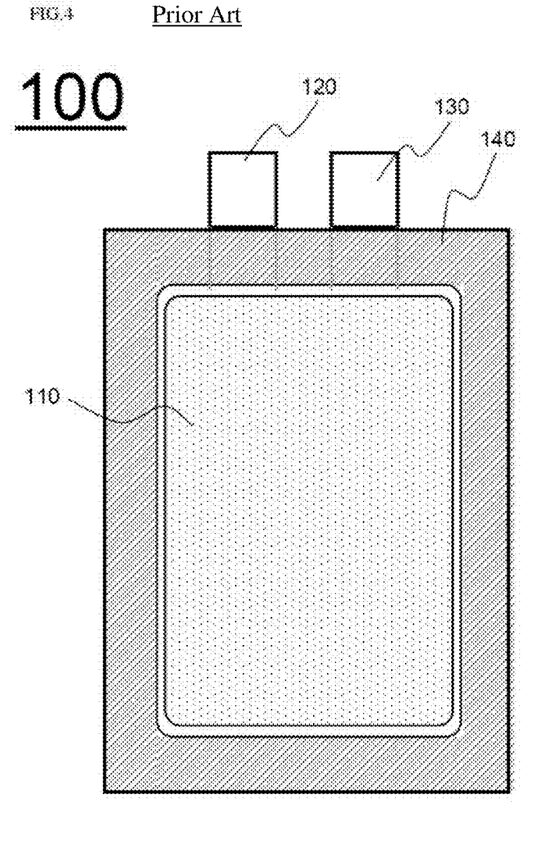
Figure 5:
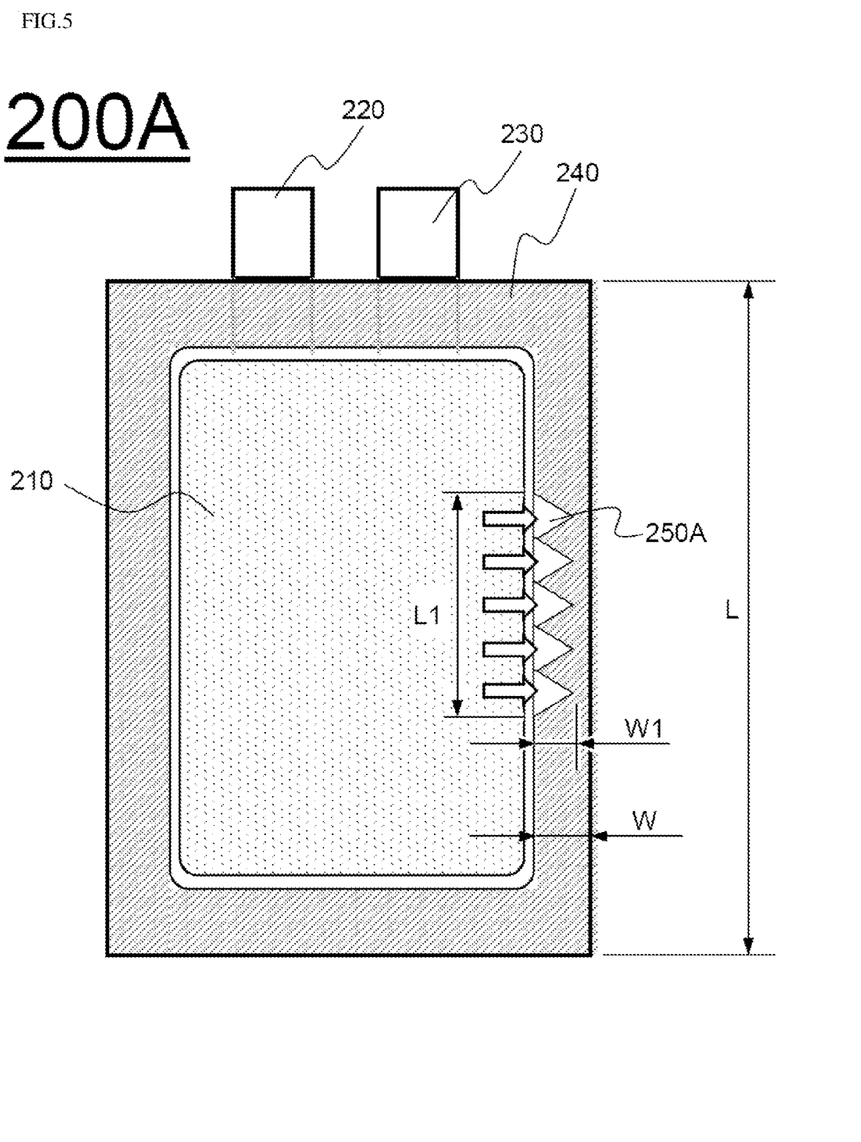
FIGS. 5 to 7 are sectional views of secondary batteries according to embodiments of the present invention.

FIG. 4 is a sectional view illustrating a structure of a conventional secondary battery 100. FIG. 5 is a sectional view illustrating a structure of a secondary battery 200A according to an embodiment of the present invention.

Referring to FIG. 4, the secondary battery 100 is manufactured by installing an electrode assembly 110 in an accommodation unit of a battery case. The electrode assembly 110 is provided at one end thereof with electrode terminals 120 and 130 extending from the electrode assembly 110 to the outside of the battery case. The battery case is hermetically sealed by forming a sealing part 140 through thermal fusion of an outer circumferential surface thereof. The sealing part 140 has a rectangular shape as seen from each side surface.

Referring to FIG. 5, the secondary battery 200A according to the embodiment of the present invention has the same basic structure as that of the secondary battery 100 of FIG. 4. There is only a difference between the secondary batteries of FIGS. 4 and 5 in that a sealing part 240 is provided at a side surface thereof with a zigzag-shaped vent part 250A in which a plurality of recessed portions are adjacent to one another. In the vent part 250A, a boundary line in the direction of an electrode assembly 210 has a continuous zigzag shape and thus, when internal pressure of the secondary battery 200A case increases, pressure is appropriately applied to the recessed portions and thus a gas may be discharged therefrom even at a relatively low pressure.

Figure 6:
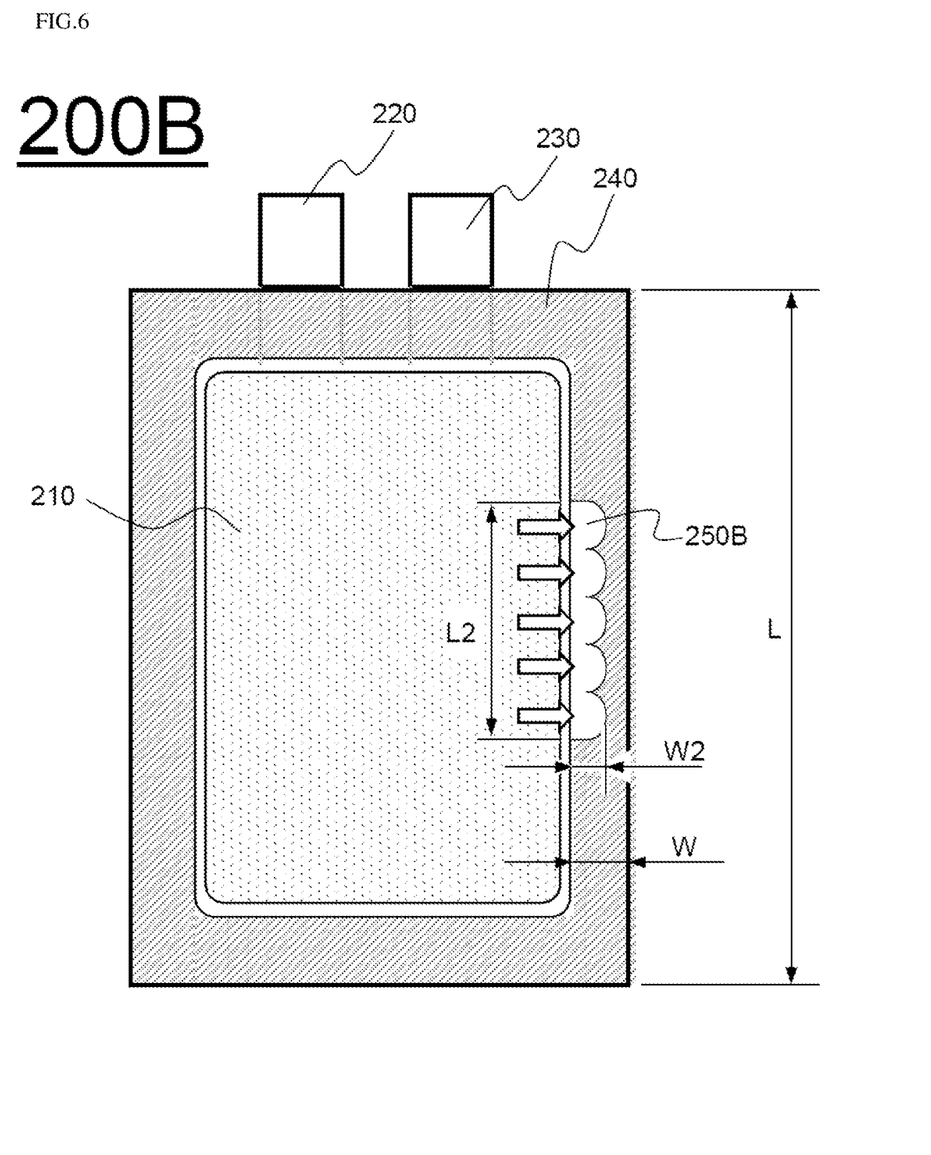
Figure 7:
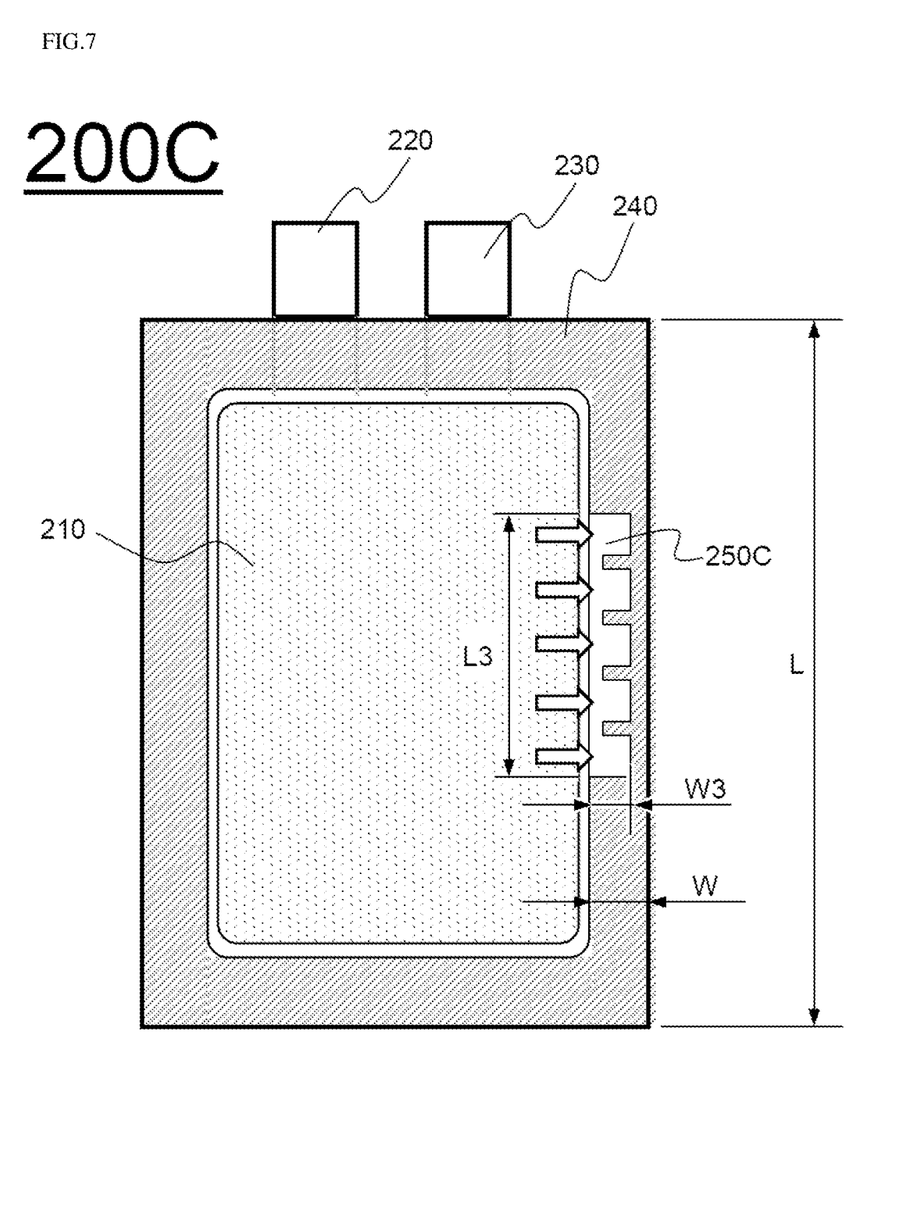

FIGS. 6 and 7 are views of secondary batteries 200B and 200C according to other embodiments of the present invention.

Referring to FIGS. 6 and 7, the secondary batteries 200B and 200C have the same basic structure as that of the secondary battery 200A of FIG. 5. There is only a difference among the secondary batteries of FIGS. 5, 6 and 7 in that zigzag-shaped vent parts 250B and 250C of FIGS. 6 and 7 in which a plurality of recessed portions are adjacent to one another have different shapes than that of the vent part 250A of FIG. 5. In particular, the vent part 250B of FIG. 6 has a structure in which recessed portions having a semicircular shape are adjacent to one another, and the vent part 250C of FIG. 7 has a structure in which recessed parts having a tetragonal shape are adjacent to one another.

Lengths L1, L2 and L3 of the respective vent parts 250A, 250B and 250C respectively illustrated in FIGS. 5 to 7 may be 5% to 40% a total length L of the sealing part. Widths W1, W2 and W3 of the respective vent parts 250A, 250B and 250C may be 5% to 50% the width W of the sealing part.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, in a secondary battery according to the present invention, recessed portions are continuously formed at a sealing part at an outer circumferential surface of a battery case and thus, when internal pressure of the secondary battery reaches a critical pressure, gas discharge may be reliably performed and safety of the secondary battery may be enhanced. In addition, the battery case is vented when abnormal operating states are not relatively severe so as to discharge internal gas and, accordingly, risk of explosion and the like may be reduced, which results in enhanced safety of the secondary battery.

The invention claimed is:

1. A secondary battery in which an electrode assembly is accommodated in a battery case,
   wherein the battery case is made of a laminate sheet comprising a resin layer and a metal layer and hermetically sealed through sealing of an outer circumferential surface thereof in a state of accommodating the electrode assembly,
   wherein at least one of sealing parts at the outer circumferential surface of the battery case is provided with at least two continuously formed recessed portions,
   wherein at least two recessed portions are continuously formed to have a zigzag shape and are directly connected with each other, and
   wherein a recess depth of the recessed portion is 5% to 50% a width of the sealing part.

2. The secondary battery according to claim 1, wherein the recessed portions have a structure in which the sealing part at the outer circumferential surface of the battery case is formed on a boundary line in the direction of the electrode assembly.

3. The secondary battery according to claim 2, wherein the zigzag shape is a shape in which, as seen on a horizontal cross-section, at least two polygons are adjacent to each other or at least two semicircles are adjacent to each other.

4. The secondary battery according to claim 1, wherein a total length of the continuously formed recessed portions is 5% to 40% a length of the sealing parts at the outer circumferential surface.

5. The secondary battery according to claim 1, wherein the number of the recessed portions is 2 to 10.

6. The secondary battery according to claim 1, wherein a width of the recessed portion is 5% to 50% a width of the sealing part.

7. The secondary battery according to claim 1, wherein the battery case comprises an inert gas injected so as to maintain an inside of the battery case at normal pressure.

8. The secondary battery according to claim 7, wherein the inert gas is at least one selected from the group consisting of helium, nitrogen, and argon.

9. The secondary battery according to claim 7, wherein the battery case is filled with the inert gas after removal of a gas generated during initial charge and discharge performed to activate the secondary battery in a manufacturing process thereof.

10. The secondary battery according to claim 1, wherein the electrode assembly is of a winding type, a stack type, or a stack/folding type.

11. The secondary battery according to claim 1, wherein the laminate sheet has a stacked structure comprising an outer resin layer, an air and moisture-blocking metal layer, and an inner thermal fusion resin layer.

12. The secondary battery according to claim 1, wherein the secondary battery is a lithium secondary battery.

13. A battery module comprising the secondary battery according to claim 1 as a unit battery.

14. A battery pack comprising the battery module according to claim 13.

15. A device comprising the battery pack according to claim 14 as a power source.

16. The device according to claim 15, wherein the device is an electric vehicle, a hybrid electric vehicle, a plug-in hybrid electric vehicle, or a system for storing power.

17. The secondary battery according to claim 1, wherein a total length of the continuously formed recessed portions is 5% to 40% a length of the sealing parts at the outer circumferential surface, and a width of the recessed portion is 5% to 50% a width of the sealing part.

* * * * *